United States Patent
Jarosch

[11] Patent Number: 6,065,787
[45] Date of Patent: May 23, 2000

[54] RETRIEVER TOOL

[76] Inventor: Robert M. Jarosch, 7721 N. Legend Vista Pl., Tucson, Ariz. 85743

[21] Appl. No.: 09/277,474

[22] Filed: Mar. 26, 1999

Related U.S. Application Data

[60] Provisional application No. 60/082,426, Apr. 20, 1998.

[51] Int. Cl.$^7$ ....................................... B25J 1/02
[52] U.S. Cl. .......................... 294/19.1; 294/1.1; 294/24; 294/65.5; 403/109.2
[58] Field of Search ................... 294/1.1, 19.1, 294/22, 23, 24, 65.5; 403/104, 109.1, 109.2, 109.3, 377

[56] References Cited

U.S. PATENT DOCUMENTS

| | | | |
|---|---|---|---|
| 930,406 | 8/1909 | McDonald | 294/19.1 |
| 1,267,915 | 5/1918 | Shellabarger | 403/109.2 |
| 1,905,076 | 4/1933 | Van Sciver . | |
| 2,218,825 | 10/1940 | Le Guillou | 294/65.5 |
| 2,597,400 | 5/1952 | Stogsdill et al. . | |
| 3,093,402 | 6/1963 | Sisson . | |
| 3,098,462 | 7/1963 | Holzman | 294/19.1 |
| 3,384,408 | 5/1968 | Furzey . | |
| 3,467,116 | 9/1969 | Ringewaldt . | |
| 3,763,872 | 10/1973 | Gooley . | |
| 3,962,748 | 6/1976 | Michaels | 294/19.1 |
| 3,987,807 | 10/1976 | Varnell . | |
| 4,105,239 | 8/1978 | Akezinski, Sr. | 294/19.1 |
| 4,653,789 | 3/1987 | McWilliams | 294/19.1 |
| 4,711,482 | 12/1987 | Brown et al. . | |
| 4,914,855 | 4/1990 | Sherman | 294/24 |
| 5,152,569 | 10/1992 | Guiboche | 294/19.1 |
| 5,176,160 | 1/1993 | Osburn . | |
| 5,348,359 | 9/1994 | Boozer . | |
| 5,381,319 | 1/1995 | Shiao . | |
| 5,515,574 | 5/1996 | Larson | 403/109.3 |
| 5,558,377 | 9/1996 | Blum et al. | 294/19.1 |
| 5,647,623 | 7/1997 | Shiao . | |

*Primary Examiner*—Dean J. Kramer
*Attorney, Agent, or Firm*—Elizabeth A. Dawn; Richard G. Harrer; Charles E. Cates

[57] ABSTRACT

A retriever tool comprised of dual telescopic shafts extending outwardly from a midpoint. The telescopic shafts are composed of a predetermined number of rectangular members which are sleeved and coupled to one another by a series of protuberances and grooves. A magnetic member and an adhesive member are located on the first distal end of the retriever tool. A hook is incorporated into the second distal end of the retriever tool. The magnetic member, adhesive member, and hook allow the user to retrieve metallic as well as non-metallic items of various sizes.

9 Claims, 2 Drawing Sheets

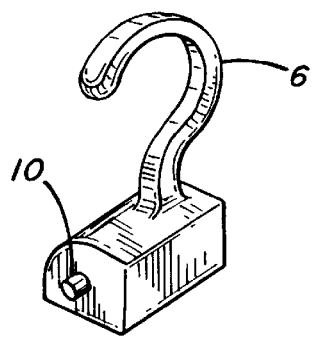
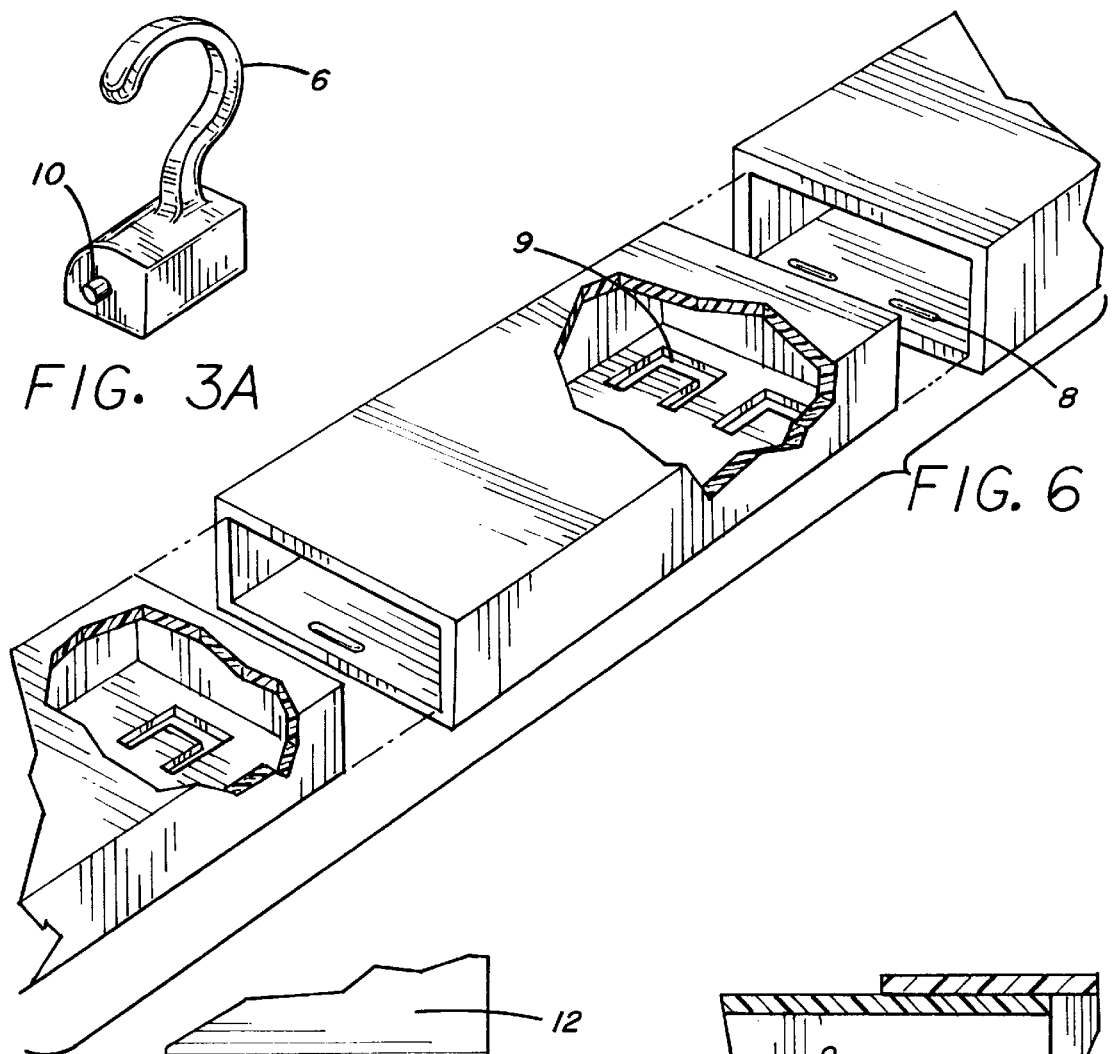
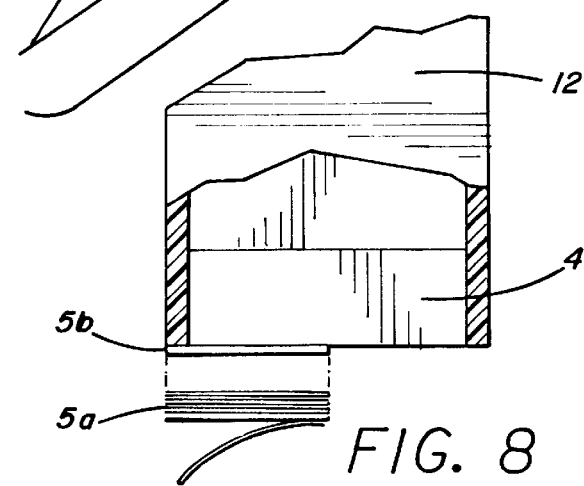
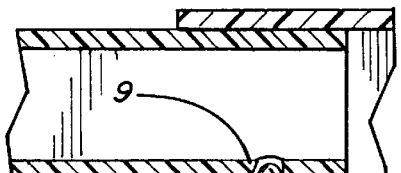

RETRIEVER TOOL

This Non-Provisional Application claims the benefit of U.S. Provisional Application Ser. No. 60/082,426 filed on Apr. 20, 1998. This invention relates to a retriever tool for use in retrieving objects without bending over and for reaching objects in hard-to-reach places.

BACKGROUND OF THE INVENTION

For those individuals who have a difficult time bending down to retrieve items on the floor, it is desirable to have a device that can be extended from the user's hand to reach those items. Additionally, some people suffer from physical conditions that limit their range of motion. In these instances, a device that is capable of reaching and retrieving items beyond the grasp of the user is also desirable. Accordingly, retrieving devices are known in the art. For example, it is known to have canes or walking sticks with various grasping devices on their distal ends. U.S. Pat. Nos. 5,176,160; 2,597,400; 3,093,402; 3,467,116; and 1,905,076 teach devices of this type. However, because the length of combination cane and retrieving devices is not adjustable, the user is limited to retrieving objects located within a defined radius.

In order to solve this problem, telescopic retriever tools have been developed. These telescopic retriever tools allow the user to retrieve objects located at various distances from the user. Telescopic retriever tools are especially useful to those users who have a limited range of motion or those who have trouble bending over to pick up objects off the floor. U.S. Pat. Nos. 3,987,807; 5,381,319; 5,647,623; and 3,384,408 teach telescoping retrieving devices. Although telescoping retrieving devices allow the user to retrieve items located at variable distances from the user, because of the decrease in diameter towards the distal end of the device, retriever tools of this type tend to be weaker than non-telescoping retriever tools of the same length.

SUMMARY OF THE INVENTION

The retriever tool of the present invention overcomes the above-mentioned problem by incorporating two telescoping shafts radiating outward in opposite directions from a midpoint. The dual telescoping capability allows the telescoping members of the tool to maintain a relatively larger diameter while at the same time reaching as far or further than the previous devices. In the present invention, each member of the telescopic shaft is larger than a comparable member of a single telescopic shaft at the same length of extension of the entire device. As a result, the dual telescopic feature of the invention provides for a stronger and more sturdy retriever tool. The telescopic shafts are composed of a predetermined number of rectangular members which are sleeved and coupled to one another. The telescopic shafts can be extended individually. This allows the unextended telescopic shaft to act as a handle, increasing the ease of manipulation of the extended telescopic shaft.

At the first distal end of the device is a magnetic member for the retrieval of metal objects and an adhesive member for the retrieval of non-metal objects. At the second distal end of the device is a hook for the retrieval of clothes and similar items or objects with too great a mass to be retrieved by the magnetic and adhesive members. The adhesive member of the tool allows the user to retrieve smooth objects that could not be retrieved using the hook. The hook allows the user to retrieve objects with a rough surface, and it also allows the user to slide far away objects closer so that the user can more easily pick those objects up. As the telescoping rectangular members extend outward from the midpoint member, the smallest rectangular member, the rectangular members become increasingly larger in cross section. This arrangement permits the distal members to have a large surface area for the attachment of a magnetic and adhesive members.

It is an object of this invention to provide a very effective device for retrieving objects without bending over and for retrieving objects from hard-to-reach places.

It is an object of this invention to provide a relatively sturdy retriever tool comprised of two telescoping shafts radiating from a midpoint.

It is another object of this invention to provide a retriever tool with a variety of reaching and grasping devices attached to the tool.

It is another object of this invention to provide a retriever tool that can retrieve metallic and non-metallic items.

Other objects of the invention will become apparent hereinafter.

BRIEF DESCRIPTION OF THE DRAWINGS

FIG. 3A is a perspective view of hook 6 with pin 10, which are incorporated into the second distal end as shown in FIG. 3.

FIG. 6 is an exploded view of several cooperating members of the device showing protuberances 8 and grooves 9.

FIG. 7 shows a sectional view of a portion of the shaft taken along lines 7—7 of FIG. 2 with the rectangular members extended with the protuberances 8 on the inner bottom surface of the larger, more distal member caught by the grooves 9 on the outer bottom surface of the smaller member located closer to the midpoint.

FIG. 8 shows the embodiment of the adhesive member 5 where the user can peel off the top double-sided adhesive strip that is no longer tacky to reveal a fresh strip of adhesive underneath.

DETAILED DESCRIPTION OF THE INVENTION

Figure 1:
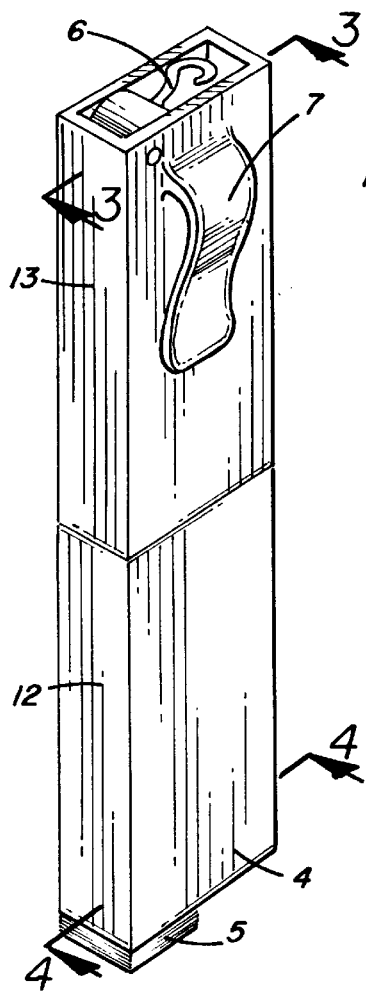
FIG. 1 is a perspective view of the retriever tool of the present invention in a closed, unextended condition. Clip 7 is optionally attached to the first or second distal end members to provide a means for attaching the retriever tool to the user's belt or other convenient location.

The retriever tool of the present invention comprises dual telescopic shafts 2 radiating in opposite directions from a midpoint member 1. FIG. 1 shows the retriever tool in its unextended condition with clip 7 optionally affixed to the second distal end member to provide a means to attaching the retrieving device to the user's clothing or other personal accessory.

Figure 2:
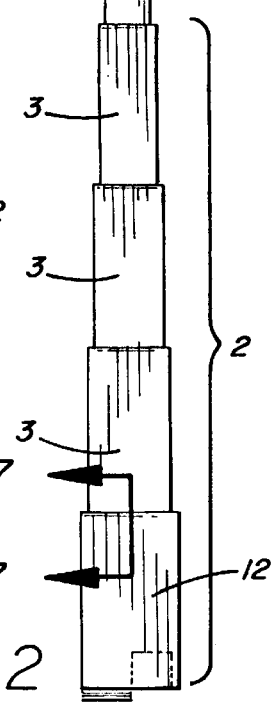
FIG. 2 is a elevational view of the dual shafts of the retriever tool shown in FIG. 1 in an extended condition.

FIG. 2 shows the retriever tool of the present invention in its fully extended position.

Each telescopic shaft is composed of a predetermined number of members 3 which are rectangular in cross section and which are sleeved and coupled to one another. In the preferred embodiment of the present invention, the midpoint member 1 is made of a nylon material while the other rectangular members are made of ABS plastic material, although other materials will be known to persons skilled in the art. In another embodiment of the invention, luminescent plastic is used to form the members, thereby facilitating locating the retriever tool in the dark. Other plastic, nylon, or rubber materials can also be used to form the members.

The rectangular members are hollow and are prevented from sliding loose from one another by a series of protuberances and grooves. Referring to FIG. 6, each rectangular member has grooves 9 on its more distal end and protuberances 8 on the end closer to the midpoint section. Protuberances are located on the inner bottom surface of the rectangular members while grooves are located on the outer bottom surface of the members.

As shown in FIG. 7, the members 3 can be slid apart until the protuberances 8 on the inner bottom surface of the larger, more distal rectangular member are caught by the grooves 9 on the outer bottom surface of the smaller rectangular member located closer to the midpoint.

Figure 4:
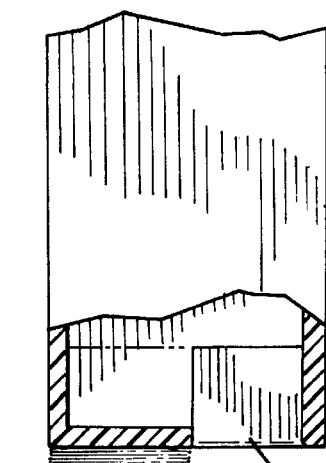
FIG. 4 is a partially broken away view of the first distal end 12 of the retriever tool shown in FIG. 1 taken along lines 4—4 showing the magnetic member 4 and the adhesive member 5.

Referring to FIG. 4, a magnetic member 4 and an adhesive member 5 are located on the first distal end 12 of the retriever tool. The magnetic member 4, preferably made of a ceramic magnet, is set into the first distal end so that the top surface of the magnet is flush with the top surface of the first distal end.

One method of using the invention consists of placing magnets with adhesive backs on non-metallic and/or non-magnetic items of common use. The user of the retriever tool is then able to use the magnetic member of the tool to retrieve those items.

In the preferred embodiment of the invention shown in FIG. 8, the magnetic member 4 extends for the entire length of the first distal end. In this embodiment, one side of magnetic member 4 is covered by adhesive member 5.

Figure 5:
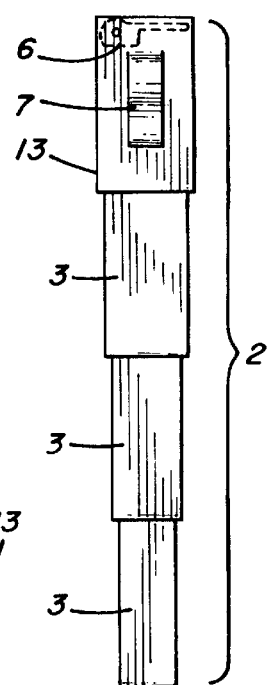
FIG. 5 is an exploded perspective view of the first distal end shown in FIG. 4, showing a stack of multiple, double-sided adhesive strips 5a affixed to a magnetic back 5b. The magnetic back is then affixed to one side of magnetic member 4.
Figure 5:
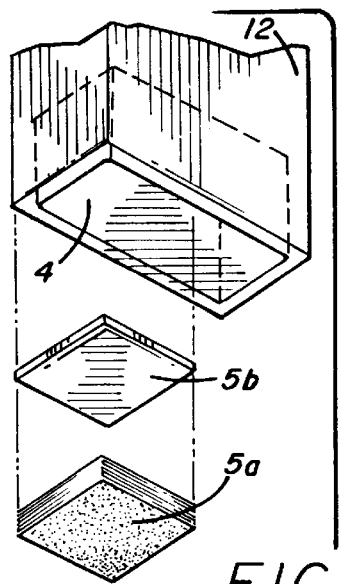

Adhesive member 5 is attached to the first distal end 12 of the retriever tool. In the embodiment of the invention shown in FIG. 5, a stack of multiple adhesive strips 5a are affixed to a magnetic back 5b. The magnetic back of the adhesive member is then affixed to one side of magnetic member 4. This embodiment of the invention allows the user to use one adhesive strip until the adhesive is no longer tacky, then peel that strip off to reveal fresh strip of adhesive underneath as shown in FIG. 8. When all the adhesive strips have been used, the user can remove the magnetic back of the adhesive member 5 from the magnetic member 4 and replace it with a new stack of adhesive strips on a magnetic back. In the embodiment of the invention which is presently preferred, adhesive member 5 is made of an sticky rubber material. A suitable material is available from Helmac as Elastalloy D63090031. In order to produce an adhesive member suitable for mounting on the first distal end 12 of the tool, about a 3 oz. portion of the Elastalloy is heated until the Elastalloy becomes a liquid of a molasses-like consistency. The liquid Elastalloy is then poured onto a flat surface and allowed to cool. A strip of Elastalloy is then cut using a die sized such that the strip of Elastalloy cut with the die extends the length of first distal end 12 of the tool. The strip of Elastalloy is then adhesively attached to the magnetic member 4 on the first distal end 12 such that magnetic member 4 is covered by the Elastalloy strip.

Figure 3:
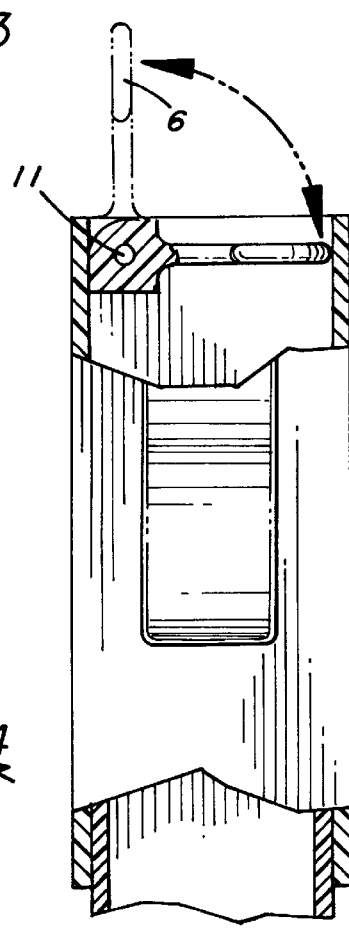
FIG. 3 is a partially broken away view of the second distal end portion of the retriever tool shown in FIG. 1 taken along lines 3—3 showing the collapsible hook of the second distal end 13 of the retriever tool.

FIG. 3 shows collapsible hook 6 incorporated into the second distal end 13 of the retriever tool. In the preferred embodiment of the invention, hook 6 is made of a nylon material for enhanced strength and durability. As shown in FIG. 3 and FIG. 3A, hook 6 is mounted into the second distal end by means of opposing pins 10 molded into the hook and receiving sockets 11 molded into the rectangular member forming the second distal end. Hook 6 can be extended to its upright position or folded down into the hollow interior of member 3 forming the second distal end as shown in FIG. 3. As shown in FIG. 3 and FIG. 3A, the rounded shape of hook 6 terminating in a squared off lower portion prevents hook 6 from rotating downward completely into the hollow interior of the rectangular member forming the second distal end. Hook 6 can be used to retrieve clothes and other items from the floor. Hook 6 can also be used to retrieve objects with too great a mass to be retrieved by the magnetic and adhesive members. Additionally, the hook should prove useful to those individuals with back problems as it can aid the user in putting on socks. Once the user has placed the sock around his/her toes, the sock can be pulled up the rest of the way using the hook on the second distal end of the retriever tool.

In an alternative embodiment of the present invention, the sleeved members are circular in cross section.

I claim:

1. A retriever tool comprising a midpoint member and two shafts of hollow telescoping members extending outward in opposite directions from said midpoint member, said shafts having a plurality of members which are sleeved and coupled to one another such that said members of said shafts may be slid apart and extended outward from said midpoint member without coming apart from one another and such that said members of said shafts may then be returned to an unextended position surrounding the outer surface of said midpoint member.

2. The retriever tool of claim 1 wherein said telescoping members increase in size in cross section as they extend outward from said midpoint member.

3. The retriever tool of claim 1 wherein said members are sleeved and coupled to one another by a series of protuberances and grooves.

4. The retriever tool of claim 1 wherein said midpoint member and said telescoping members are rectangular in cross section.

5. The retriever tool of claim 1 wherein said midpoint member and said telescoping members are circular in cross section.

6. The retriever tool of claim 1 wherein an adhesive member is attached to the end of one of said shafts of telescoping members opposite said midpoint member.

7. The retriever tool of claim 1 wherein a magnetic member is attached to the end of one of said shafts of telescoping members opposite said midpoint member.

8. The retriever tool of claim 1 wherein a collapsible hook is attached to the end of one of said shafts of telescoping member s opposite said midpoint member.

9. The retriever tool of claim 1 wherein a clip is attached to the end of one of said shafts of telescoping members opposite said midpoint member to facilitate attaching said retriever tool to the user's clothing.

* * * * *